(12) United States Patent
Spesser et al.

(10) Patent No.: US 12,537,432 B2
(45) Date of Patent: Jan. 27, 2026

(54) METHOD AND DEVICE FOR COMPENSATING LEAKAGE CURRENTS IN AN ELECTRICAL POWER CONVERTER

(71) Applicants: Dr. Ing. h.c. F. Porsche Aktiengesellschaft, Stuttgart (DE); Fraunhofer-Gesellschaft zur Förderung der angewandten Forschung e.V., Munich (DE)

(72) Inventors: Daniel Spesser, Illingen (DE); Tim Pfizenmaier, Leonberg (DE); Florian Mayer, Tamm (DE); Stefan Endres, Erlangen (DE)

(73) Assignees: Dr. Ing. h.c. F. Porsche Aktiengesellschaft, Stuttgart (DE); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 197 days.

(21) Appl. No.: 18/520,307

(22) Filed: Nov. 27, 2023

(65) Prior Publication Data

US 2024/0178738 A1    May 30, 2024

(30) Foreign Application Priority Data

Nov. 28, 2022 (DE) ...................... 10 2022 131 311.5

(51) Int. Cl.
*H02M 1/00* (2007.01)
*H02J 7/00* (2006.01)
(Continued)

(52) U.S. Cl.
CPC ......... *H02M 1/0038* (2021.05); *H02J 7/0029* (2013.01); *H02J 7/02* (2013.01);
(Continued)

(58) Field of Classification Search
CPC ............ H02M 1/0038; H02M 1/0043; H02M 1/0009; H02M 1/32; H02J 7/0029; H02J 7/02; H02J 2207/20; H02J 7/00304
See application file for complete search history.

(56) References Cited

U.S. PATENT DOCUMENTS 8,203,308 B1 *  6/2012 Guo ...................... B60L 3/0069
                                                                    361/101
9,099,945 B2 *  8/2015 Sakai .................. H02M 5/4585
(Continued)

FOREIGN PATENT DOCUMENTS

DE    10 2010 013 642    10/2011

OTHER PUBLICATIONS

British Search Report for GB2318044.1 dated May 22, 2024.

*Primary Examiner* — Rafael O De Leon Domenech
(74) *Attorney, Agent, or Firm* — Gerald E. Hespos; Michael J. Porco

(57) ABSTRACT

A method compensates for leakage currents in a protective conductor of an electrical power converter. The method includes: using a first differential current sensor for determining a differential current depending on a phase conductor current in a phase conductor and a neutral conductor current in a neutral conductor; feeding a compensation current into the phase conductor and/or into the neutral conductor via a first compensation circuit; using a second differential current sensor for capturing a signal representing remaining residual leakage current; converting the signal representing the residual leakage current to a frequency domain; generating a compensation signal for the residual leakage current in a frequency-selective manner; converting the compensation signal to a time domain; supplying the converted compensation signal converted to the first compensation circuit or a second compensation circuit; and feeding a residual com-
(Continued)

pensation current corresponding to the compensation signal into the phase conductor(s) and/or into the neutral conductor.

11 Claims, 4 Drawing Sheets

(51) Int. Cl.
 *H02J 7/02* (2016.01)
 *H02M 1/32* (2007.01)
(52) U.S. Cl.
 CPC ....... *H02M 1/0009* (2021.05); *H02M 1/0043* (2021.05); *H02M 1/32* (2013.01); *H02J 7/00304* (2020.01); *H02J 2207/20* (2020.01)

(56) References Cited

U.S. PATENT DOCUMENTS

| | | | |
|---|---|---|---|
| 9,350,162 B2* | 5/2016 | Bettenwort | H02H 3/16 |
| 9,696,743 B1* | 7/2017 | Treichler | G05F 3/02 |
| 10,819,214 B2 | 10/2020 | Karinca | |
| 2012/0249067 A1* | 10/2012 | Hein | B60L 3/12 |
| | | | 320/109 |
| 2014/0210411 A1* | 7/2014 | Fluxa | H02J 3/02 |
| | | | 320/109 |
| 2016/0134102 A1* | 5/2016 | Bieniek | H02H 9/02 |
| | | | 363/55 |
| 2016/0380546 A1* | 12/2016 | Wang | H02M 1/44 |
| | | | 363/21.12 |
| 2017/0302217 A1* | 10/2017 | Shinomoto | H02P 27/06 |
| 2020/0036180 A1 | 1/2020 | Spesser et al. | |

* cited by examiner

METHOD AND DEVICE FOR COMPENSATING LEAKAGE CURRENTS IN AN ELECTRICAL POWER CONVERTER

CROSS REFERENCE TO RELATED APPLICATION

This application claims priority on German Patent Application No 10 2022 131 311.5 filed Nov. 28, 2022, the entire disclosure of which is incorporated herein by reference.

BACKGROUND

Field of the Invention

The invention relates to a method for reducing leakage currents in a protective conductor of an electrical power converter, for example a battery charging circuit, which, in addition to the protective conductor, comprises a neutral conductor and at least one phase conductor. A further subject-matter of the invention is a device to carry out a method of this type.

Related Art

The number of registrations of electric vehicles is increasing annually. The efficient charging of the traction battery represents a key technology for the further success of e-vehicles on the market. In this connection, increasing attention recently has focused on concepts of transformerless on-board charging devices. High leakage currents to ground and through the protective converter must be prevented for a given, substantial leakage capacitance of the battery and the connected high-voltage system, particularly in the case of transformerless charging devices.

Leakage currents caused by the power converter can occur in the protective conductor of the power supply, particularly in battery charging circuits in which power converters without galvanic isolation, i.e. without an isolating transformer, are connected to a power supply. Leakage current that exceeds a predefined value normally triggers of a residual current device (RCD) and interrupts the current flow. The residual current device cannot distinguish between operationally related leakage currents of this type, i.e. caused, for example, by a power converter, and leakage currents that are caused by an insulation fault. Unwanted shutdowns therefore occur and restrict the availability of the power supply or the power converter.

The prior art uses a measuring transformer to measure charging currents within the charging electronics and feeds an inverted signal derived therefrom by means of a current source into at least one conductor of the respective phase or the corresponding neutral conductor. Thus, the leakage current and the fed-in compensation current cancel one another and no overall leakage current occurs on the protective conductor.

FIG. 1 shows a corresponding schematic view of the characteristics of the leakage currents with ideal compensation. Charging electronics 212 are supplied with electrical energy from an AC voltage source 202 via a phase conductor L and a neutral conductor N. A measuring transformer 210 is arranged at the input of the charging electronics 212 and measures the currents flowing into the charging electronics. A possible difference in the currents can be caused, for example, by capacitive coupling to ground. The differential current is supplied to a compensation circuit 208 that correspondingly impresses opposite-phase currents into the conductors. Thus, only a residual current possibly remaining as a result of tolerances and other non-ideal characteristics of the components of the compensation circuit 208 or of the measuring transformer 210 reaches the differential current sensor of a guard circuit 206 and the input filter 204. Leakage currents are indicated by the arrows arranged next to the lines, and the dotted arrows designate residual leakage currents.

One object of the invention is to provide an improved method and a corresponding device for compensating leakage currents.

SUMMARY OF THE INVENTION

A first aspect of the invention relates to a method for compensating leakage currents in a protective conductor of an electrical power converter, in particular of a battery charging circuit. In addition to the protective conductor, the electrical power converter comprises a neutral conductor and at least one phase conductor. The method comprises initially determining a differential current depending on a phase conductor current in the phase conductor(s) and a neutral conductor current in the neutral conductor, for example by means of a first differential current sensor. The method further comprises generating and feeding a compensation current into the phase conductor(s) and/or into the neutral conductor, by means of a first compensation circuit. The compensation current compensates a leakage current caused by the differential current.

The method does not directly measure the leakage current in the protective conductor, but instead determines the leakage current indirectly by determining a differential current corresponding to the leakage current. This differential current is determined as the difference between the currents in the phase conductor and the neutral conductor. A compensation current is generated and fed into the phase conductor(s) and/or into the neutral conductor depending on the determined differential current. The measurement and the compensation of the leakage current can therefore be performed without a galvanic connection to the protective conductor. As a result, a galvanic isolation in the corresponding compensation circuit, for example by a transformer, is not required. This means that the compensation circuit can be compact and lightweight.

As described above, a residual leakage current can remain despite the aforementioned compensation. According to the invention, the method therefore further comprises capturing a signal representing a remaining residual leakage current by means of a second differential current sensor associated with a guard circuit. According to the invention, this second differential current sensor is the current sensor present in a guard circuit that is always prescribed for safety reasons, for example an RCD circuit. The measured residual leakage current is used to generate a further compensation signal.

A P, PI or PID controller can essentially be used to adjust the differential current measured by the second differential current sensor to zero.

The invention exploits the realization that the remaining residual leakage current is small due to the compensation carried out in the first compensation circuit. Thus, the required dynamics of the additional compensation can be less than in the first compensation circuit. The two-stage structure enables stability of the overall system to be ensured more easily. The additional compensation can therefore equalize tolerances of the first compensation circuit, i.e. greater tolerances are permissible in the first compensation circuit, thereby simplifying its design and reducing costs.

The differential current sensor is provided explicitly to measure DC leakage currents. Accordingly, a direct connection of a controller to the differential current sensor is not possible, since a connection of this type would result in DC currents also being compensated in an impermissible manner.

The method must further ensure that the function of a monitoring circuit for the protective conductor is not impaired. Monitoring circuits of this type evaluate a low-frequency test signal, for example an artificially generated leakage current in the range between 300 and 400 Hz, to monitor the state of the protective conductor. This test signal must not be compensated by the second compensation circuit.

The method therefore further comprises converting the signal representing the residual leakage current to the frequency domain, and generating a further compensation signal that is suitable for compensating at least parts of the residual leakage current in a frequency-selective manner. Dominant spectral components in the differential current can be identified through the conversion to the frequency domain, and the compensation current can be generated according to these spectral components. It has proven particularly advantageous if a frequency spectrum of the determined differential current is determined in a frequency range from 20 Hz to 300 KHz. A Fourier transform, for example, in particular a fast Fourier transform (FFT), can be used to determine the frequency spectrum. Alternatively, the frequency spectrum can be determined by a P-Burg algorithm or a trigonometric algorithm.

The further compensation signal is generated in such a way that at least DC currents and currents having the frequency of the test signal are not taken into account or compensated. The further compensation signal then is converted once more to the time domain and is supplied to the first compensation circuit as a further control signal or to the second compensation circuit. A residual compensation current corresponding to the further compensation signal then is fed from the first or second compensation circuit into the phase conductor(s) and/or into the neutral conductor. The residual compensation current can be fed in, for example, by a digital-to-analog converter or by an amplifier, in particular by means of a rail-to-rail (R2R) amplifier or a class D amplifier.

In one or more embodiments, the further compensation signal is generated in such a way that the fundamental wave of the network frequency and low harmonics, for example the first to fifth harmonic, are taken into account by the controller. Different control parameters can be predefined separately for each frequency. The system can also activate further frequencies through its own analysis of the spectrum, so that the smallest possible leakage current is achieved.

One advantageous embodiment includes using an analog-to-digital converter for converting the determined differential current into a digital differential current. The provision of a digital differential current enables the digital processing of the determined differential current, for example in a microcontroller or digital filter. In this way, the installation space required for the compensation circuit can be decreased and the susceptibility of the compensation circuit to interference can be reduced.

According to one advantageous embodiment of the invention, the compensation current is generated depending on the determined differential current and a predefined phase shift. The amount of the compensation current preferably is identical to the amount of the differential current. The predefined phase shift is preferably 180°.

The compensation current may be fed via a capacitive coupling into the phase conductor and/or the neutral conductor so that a galvanic coupling to the protective conductor is not required.

According to some embodiments, the compensation current is fed via an inductive coupling into the phase conductor and/or the neutral conductor.

The compensation current of some embodiments is fed via a galvanic coupling into the phase conductor and/or the neutral conductor.

The invention also relates to a device for reducing leakage currents in a protective conductor of a power supply of an electric power converter, for example a battery charging circuit. The device has a neutral conductor and a phase conductor in addition to the protective conductor. The device also comprises a first differential current sensor that measures a differential current depending on a phase conductor current in the phase conductor and a neutral conductor current in the neutral conductor. The device further has a first compensation circuit for feeding a compensation current into the phase conductor and/or into the neutral conductor. The compensation current compensates a leakage current caused by the differential current.

The device of the invention is configured to capture a signal representing a remaining residual leakage current, for example by means of a second differential current sensor associated with a guard circuit. The device also converts the signal representing the residual leakage current to the frequency domain. The device further comprises a controller that operates in the frequency domain and is configured to generate a compensation signal in a frequency-selective manner so that at least DC current signals and signals having the frequency of a test signal are not taken into account.

In some embodiments, the controller is parameterized so that the fundamental wave of the network frequency and low harmonics, for example the first to fifth harmonic, are taken into account by the controller. Different control parameters can be predefined separately for each frequency.

Compensation signals supplied by the controller in the frequency domain are then converted into signals in the time domain and are supplied as a control signal to the first or to a second compensation circuit, for example via a digital-to-analog converter, to which a digital control signal in the time domain is supplied.

The frequency-selective control enables a compensation—within certain limits—of the phase response of the sensor. As a result, either a lower-cost sensor with poorer measurement characteristics is used or, if a more precise and therefore more expensive sensor is retained, the performance of the compensation is improved.

In some embodiments, the device comprises means for the capacitively coupled feeding of the compensation current into the phase conductor and/or the neutral conductor, so that a galvanic coupling to the protective conductor is not required.

Some embodiments of the device have means for the inductively coupled feeding of the compensation current into the phase conductor and/or the neutral conductor.

Some embodiments of the device comprise means for galvanically coupled feeding of the compensation signal into the phase conductor and/or the neutral conductor.

A further aspect of the invention relates to a charging device for charging an electrical energy store having a power supply and a device described above.

In one embodiment, the charging device is a galvanically non-isolated charging device.

A control device also is provided to implement at least parts of the method, in particular converting the signal representing the residual leakage current to the frequency domain, generating the compensation signal that is suitable for compensating for at least parts of the residual leakage current in a frequency-selective manner, and converting the compensation signal to the time domain. The control device may comprise a microprocessor, a volatile and non-volatile memory, and one or more measurement interfaces and/or data interfaces that are interconnected via one or more data lines or data buses for communication purposes. The non-volatile memory contains computer program instructions which, when executed by the microprocessor of the control device, configure the control device to carry out at least parts of the method of the invention.

A computer program product that implements the method of the invention has commands that, when executed by a microprocessor of a control device, prompt the control device to execute one or more embodiments of the method of the invention.

The computer program product can be stored on a computer-readable medium or data carrier. The medium or the data carrier can be physically embodied, for example as a hard disk, CD, DVD, flash memory or the like, but the medium or data carrier can also comprise a modulated electrical, electromagnetic or optical signal that can be received by a computer by means a corresponding receiver and can be stored in the memory of the computer.

Further details and advantages of the invention will be explained below on the basis of the exemplary embodiments shown in the figures.

DETAILED DESCRIPTION

Identical or similar elements can be denoted with the same reference signs in the figures.

Figure 1:
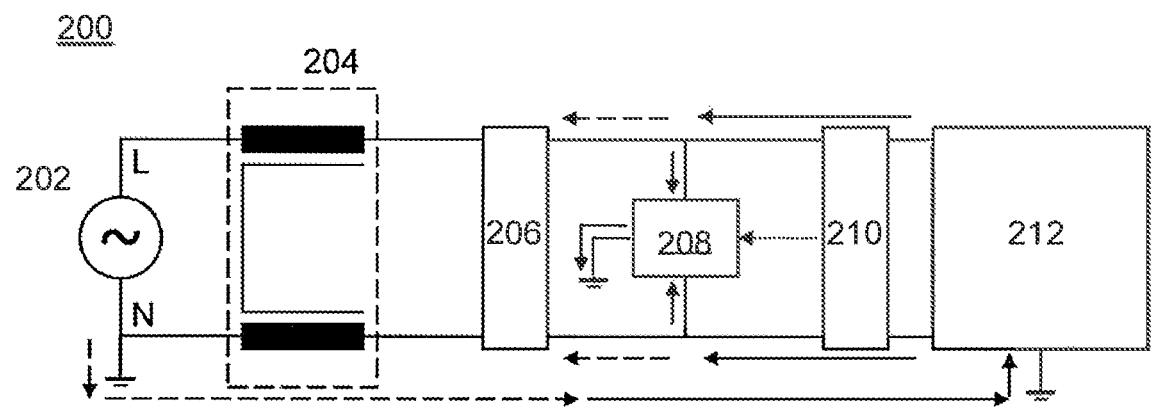
FIG. 1 is a schematic illustration of a prior art device for reducing leakage currents in a protective conductor of a battery charging circuit.

FIG. 1 was described above and will not be explained again.

Figure 2:
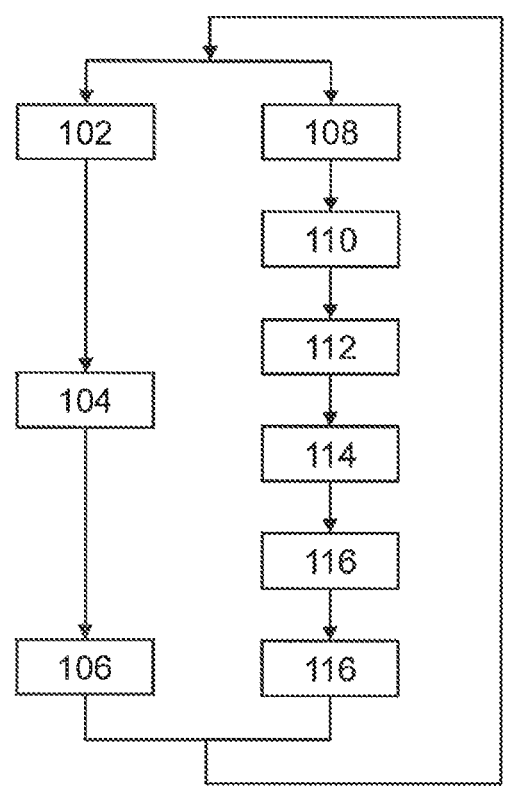
FIG. 2 is a flow diagram of an exemplary embodiment of a method according to the invention for reducing leakage currents.

FIG. 2 is a flow diagram of an embodiment of a method 100 according to the invention for reducing leakage currents. In step 102, a differential current is determined depending on a phase conductor current in a phase conductor L and on a neutral conductor current in an associated neutral conductor N in a first differential current sensor 210. In step 104, a corresponding compensation current is generated and fed in step 106 from a first compensation circuit 208 into the phase conductor L and/or into the neutral conductor N. In step 108, a remaining residual leakage current is measured by means of a second differential current sensor 206 associated with a guard circuit 206, and, in step 110, a signal representing the residual leakage current is converted to the frequency domain. In step 112, a compensation signal is generated which is suitable for compensating at least parts of the residual leakage current in a frequency-selective manner. In step 114, the compensation signal is converted to the time domain and, in step 116, is supplied to the first compensation circuit 208 or to a second compensation circuit 207 which feeds a residual compensation current corresponding to the compensation signal into the phase conductor L and/or into the neutral conductor N.

Apart from technically related delays, steps 108 to 118 are carried out essentially simultaneously and in parallel with steps 102 to 106 and are executed in a continuously repeated manner. The delays can be compensated at least partially through corresponding adjustment of the compensation signals.

Self-test steps which are carried out before the method described above is carried out and which can comprise function tests of the individual elements and a calibration are not shown in the figure.

Figure 3:
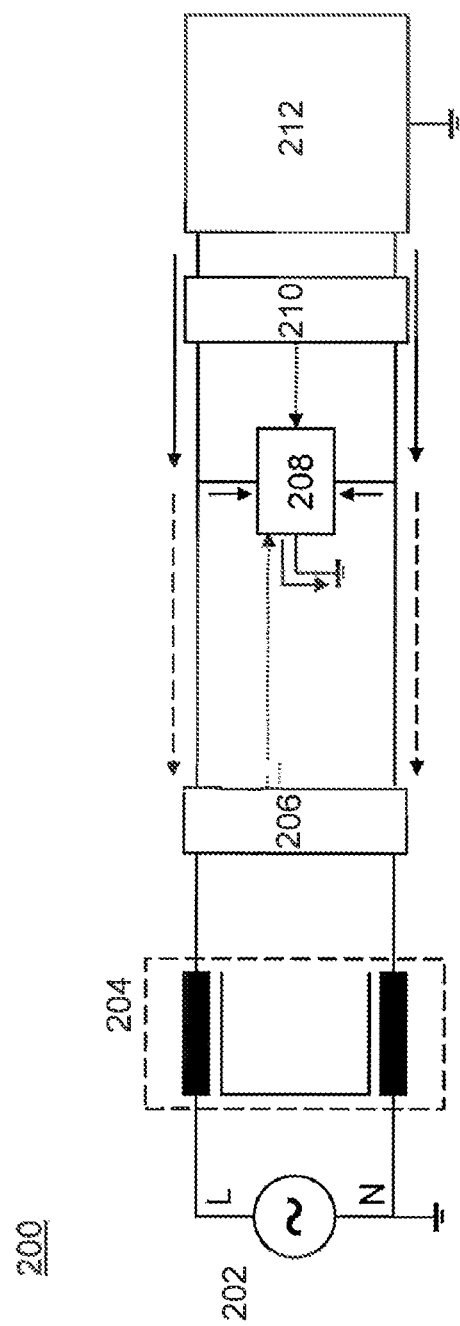
FIG. 3 is a schematic view of a first embodiment of a device of the invention for reducing leakage currents in a protective conductor of a battery charging circuit.

FIG. 3 is a schematic illustration of a first embodiment of a device 200 according to the invention for reducing leakage currents in a protective conductor of a battery charging circuit. The elements shown in FIG. 3 and their arrangement in relation to one another correspond to FIG. 1. In contrast to the known arrangement, a signal captured by a differential current sensor of the guard circuit 206 and corresponding to a residual leakage current is supplied to the first compensation circuit 208. The first compensation circuit 208 can then also compensate a remaining residual leakage current which—ideally measured closer to the input filter 204—possibly remains following the feed-in of the signals from the measuring transformer 210. The greatest possible compensation of leakage currents by the device 200 according to the invention is indicated by the currents that are not present between the two grounding points which are connected by means of the protective conductor not shown in the figure.

Figure 4:
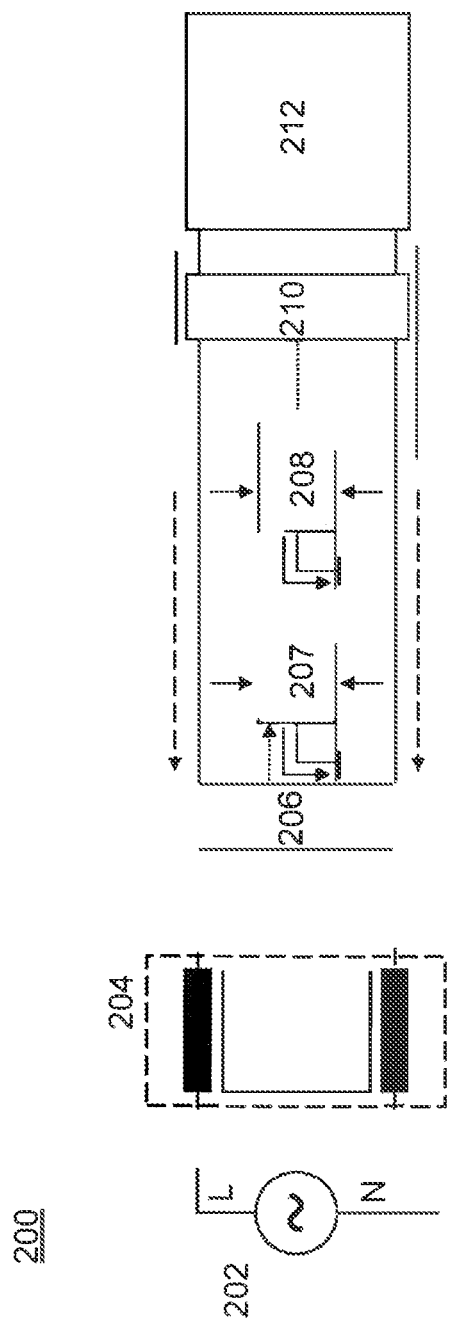
FIG. 4 is a schematic view of a second embodiment of a device for reducing leakage currents in a protective conductor of a battery charging circuit.

FIG. 4 is a schematic view of a second embodiment of an example of a device 200 according to the invention for reducing leakage currents in a protective conductor of a battery charging circuit. The elements shown in FIG. 4 and their arrangement in relation to one another correspond largely to FIG. 1. In contrast to the known arrangement, a signal captured by a differential current sensor of the guard circuit 206 and corresponding to a residual leakage current is supplied to a second compensation circuit 207. This second compensation circuit 207 can correspond in terms of its function to the first compensation circuit, but can be designed with other components due to the possibly less stringent requirements for the dynamics of the residual compensation current that is to be fed in. As previously in FIG. 3, the greatest possible compensation of leakage currents by the device 200 according to the invention is indicated in this figure by the currents that are not present between the two grounding points which are connected by means of the protective conductor not shown in the figure.

Figure 5:
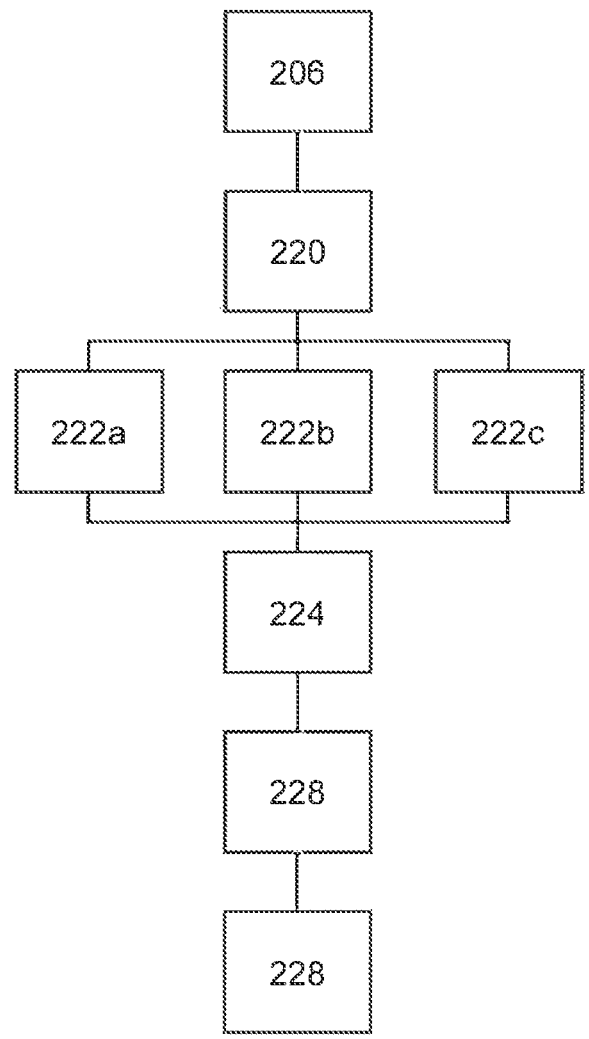
FIG. 5 is a block diagram of components of a device according to the invention.

FIG. 5 is a block diagram of components of an example of a device according to the invention. A differential current sensor of a guard circuit 206 supplies a signal which represents a differential current and which simultaneously represents a leakage current and which is supplied to a block 220 in order to convert the signal from the time domain to the frequency domain. The block 220 for converting the signal from the time domain to the frequency domain outputs a representation of the signal representing the differential current in the frequency domain, i.e. a spectral representation of the signal, which is supplied to one or more controllers 222a, 222b, 222c which output compensation signals at different frequencies. It should be noted that the one or more controllers can be implemented in a correspondingly programmed and parameterized microprocessor, and that the representation in the figure is to be understood only as an example. The signals of the one or more controllers are supplied to a block 224 in order to convert the signal from the frequency domain to the time domain. The output signal of said block 224, which can be present as a digital signal and which corresponds to a compensation signal for the residual leakage current, is supplied to a digital-to-analog converter 226 and is fed from a current source 228 into the phase conductor and/or into the neutral conductor.

Figure 6:
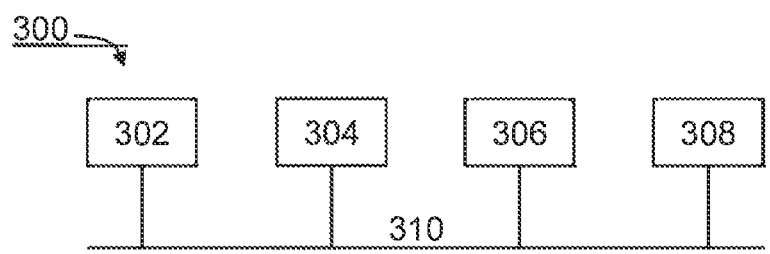
FIG. 6 is an example of a block diagram of a control device of the invention to carry out at least parts of the method of the invention.

FIG. 6 shows an example of a block diagram of a control device 300 of the device 200 according to the invention configured to carry out at least parts of the method according to the invention. The control device 300 comprises a microprocessor 302, a volatile memory 304 and a non-volatile memory 306, and also one or more measurement interfaces and/or data interfaces 308 which are interconnected via one or more data lines or data buses 310 for communication purposes. The current drain or charging of the electrochemical energy store can be measured via the one or more measurement interfaces. Information can be output to a user via the one or more data interfaces. The non-volatile memory 306 contains computer program instructions which, when they are executed by the microprocessor 302 of the control device 300, configure said control device to carry out at least parts of the method according to the invention.

The invention claimed is:

1. A method (100) for compensating leakage currents in a protective conductor of an electrical power converter, electrical power converter further having a neutral conductor (N) and at least one phase conductor (L), the method comprising:
   determining (102) a differential current depending on a phase conductor current in the at least one phase conductor (L) and on a neutral conductor current in the neutral conductor (N) in a first differential current sensor (210);
   generating (104) and feeding (106) a compensation current into the at least one phase conductor (L) and/or into the neutral conductor (N), said compensation current compensating a leakage current caused by the differential current, by means of a first compensation circuit (208);
   capturing (108) a signal representing a remaining residual leakage current by means of a second differential current sensor (206) associated with a guard circuit (206);
   converting (110) the signal representing the residual leakage current to a frequency domain;
   generating (112) a compensation signal that is suitable for compensating at least parts of the residual leakage current in a frequency-selective manner;
   converting (114) the compensation signal to a time domain;
   supplying (116) the compensation signal converted to the time domain to the first compensation circuit (208) or to a second compensation circuit (207); and
   feeding (118) a residual compensation current corresponding to the compensation signal into the at least one phase conductor (L) and/or into the neutral conductor (N), by means of the first compensation circuit (208) or the second compensation circuit (207).

2. The method of claim 1, further comprising determining a frequency spectrum of the residual leakage current.

3. The method of claim 2, further comprising generating the residual compensation current depending on the determined frequency spectrum and a predefined phase shift.

4. The method of claim 1, further comprising feeding the compensation current and/or the residual compensation current in via a capacitive coupling.

5. The method of claim 1, further comprising feeding the compensation current and/or the residual compensation current in via an inductive coupling.

6. The method of claim 1, further comprising feeding the compensation current and/or the residual compensation current in via a galvanic coupling.

7. A non-transitory computer program product comprising commands which, when the program is executed by a microprocessor of a control device, prompt the control device to carry out the method of claim 1.

8. A non-transitory computer-readable medium, on which the non-transitory computer program of claim 7 is stored.

9. A device (200) for compensating leakage currents in a protective conductor of an electrical power converter that further has a neutral conductor (N) and at least one phase conductor (L), the device (200) comprising:
   a determining device (210) for determining a differential current depending on both a phase conductor current in the at least one phase conductor (L) and a neutral conductor current in the neutral conductor (N);
   a first compensation circuit (208) for feeding a compensation current into the at least one phase conductor (L) and/or into the neutral conductor (N), the compensation current compensating a leakage current caused by the differential current;
   a guard circuit (206) with a differential current sensor that is configured to capture a signal representing a remaining residual leakage current;
   a circuit (220) for converting the signal representing the residual leakage current to the frequency domain;
   at least one controller (222) for generating a compensation signal that is suitable for compensating at least parts of the residual leakage current in a frequency-selective manner; and
   a circuit (224) for converting the compensation signal to the time domain; wherein
   the device is configured to feed a residual compensation current corresponding to the compensation signal by means of the first compensation circuit (208) or the second compensation circuit (207) into the at least one phase conductor (L) and/or into the neutral conductor (N).

10. A charging device for charging an electrical energy store, having a power supply (202) and the device of claim 9.

11. The charging of claim 10, wherein the charging device is a galvanically non-isolated charging device.

* * * * *